United States Patent

[11] 3,549,836

| [72] | Inventor | Howard R. Jilbert<br>St. Joseph, Mich. |
|---|---|---|
| [21] | Appl. No. | 782,857 |
| [22] | Filed | Dec. 11, 1968 |
| [45] | Patented | Dec. 22, 1970 |
| [73] | Assignee | The Bendix Corporation<br>a corporation of Delaware |

[54] DIFFERENTIAL PRESSURE SWITCH WITH BOURDON TUBE ACTUATING MEANS
6 Claims, 5 Drawing Figs.

| [52] | U.S. Cl. | 200/81.8,<br>73/412 |
|---|---|---|
| [51] | Int. Cl. | H01h 35/36 |
| [50] | Field of Search | 73/412;<br>29/157; 338/40; 200/81.8 |

[56] References Cited
UNITED STATES PATENTS

| 1,670,313 | 5/1928 | Oswald | 73/412 |
| 2,243,398 | 5/1941 | Sewell | 73/412UX |
| 3,048,040 | 8/1962 | Pegram | 73/412 |
| 3,247,716 | 4/1966 | Ranke | 73/412X |

*Primary Examiner*—Robert K. Schaefer
*Assistant Examiner*—J. R. Scott
*Attorneys*—Richard G. Geib and Plante, Arens, Hartz, Hix and Smith ABSTRACT: This invention relates to a switch means sensitive to differential pressures in separate hydraulic circuits to provide a completion of an electrical circuit to a remote indicator means whenever the differential pressure has approached an abnormal condition.

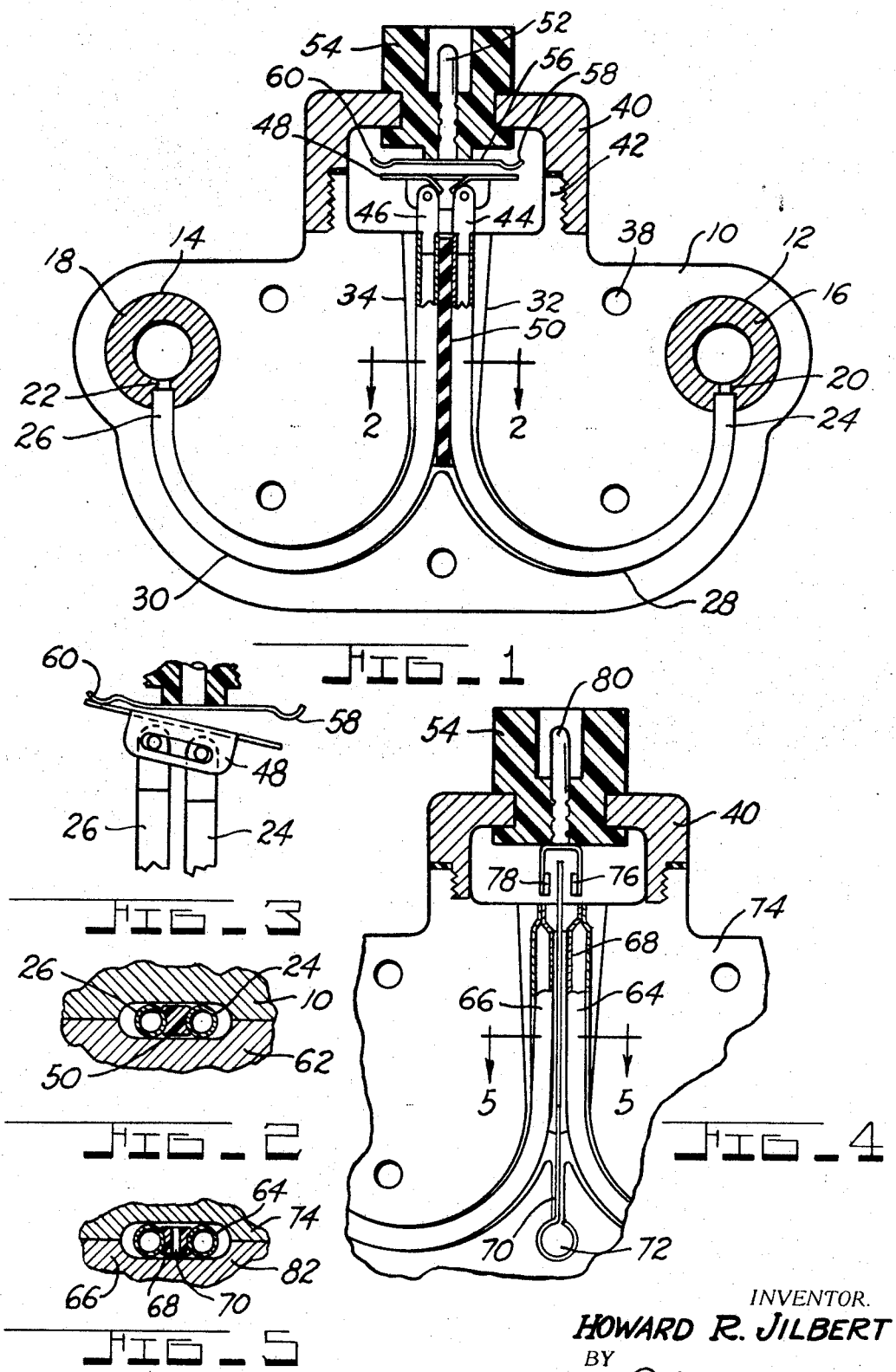

DIFFERENTIAL PRESSURE SWITCH WITH BOURDON TUBE ACTUATING MEANS

SUMMARY

In response to Federal Safety Standards for motor vehicles employing split brake systems several approaches at providing a visual indication to the vehicle operator of an abnormality in his braking system have been devised. Most of the systems on the market today employ a piston device centered by springs to which separate braking system pressures are communicated at opposite ends of the piston so that an abnormal pressure differential between the separate systems will move the piston to activate a switch by completing a ground circuit for an indicator light on the vehicle's dashboard. The use of such a piston within a housing requires expensive machining and tolerance control which have created some price penalties for automotive vehicles.

It is, therefore, a principal object of this invention to disclose a simplified pressure differential switch which is practical and more economical than presently available on the market.

A more particular object of this invention is to utilize Bourdon tubes that are segregated with respect to each other and sensitive to separate system pressures to control a switching means in series with electrical indicating device and an electrical power source.

DESCRIPTION

Other objects and advantages will most certainly appear to those skilled in the art to which this invention relates from the following description relative to the drawings in which:

FIG. 1 shows a preferred form of this invention in cross section;

FIG. 2 is a cross-sectional illustration along lines 2—2 of FIG. 1;

FIG. 3 is a partial cross-sectional view of the switch means of FIG. 1 showing the switch in an operated condition;

FIG. 4 is a partial cross section of a modified form of the invention; and

FIG. 5 is a partial cross-sectional view taken along lines 5—5 of FIG. 4.

With regard now to FIG. 1 there is shown a housing 10 for the switch means in accordance with the principles of this invention that is provided with separate bores 12 and 14 in which conduits 16 and 18 are located upon joining the two halves of the housing, one half 10 being shown in FIG. 1. The conduits 16 and 18 are provided with radial ports 20 and 22 to which one end of Bourdon tubes 24 and 26 are sealingly connected, as by a brazed joint. The housing half 10, as well as its companion half, is machined to have arcuate cavities 28 and 30 opening into a combined cavity having diverging walls 32 and 34. At the location where the Bourdon tube projects from bores 12 and 14 the arcuate cavities 28 and 30 are sized to closely hold Bourdon tubes 24 and 26. The housing half, such as the half 10 are provided with a plurality of drilled holes, such as hole 38 through which mounting bolts may be extended to adapt the switch means to vehicle structure. Conduits 16 and 18 are normally closed at one end, which in the case of the structure shown would be closed at the end in the half mated with housing portion 10, and open at the other end to an inlet port for housing 10 that is connected with the separate brake lines (not shown) of the vehicle. Thus, it is not necessary to provide seals about the bores 12 and 14 upon joining of the two housing sections. In fact, they may be joined by threading a cap 40 to a tubular boss 42 of each housing section.

However, before joining the housing sections the Bourdon tubes are closed by means of caps 44 and 46 pivotally mounting a switch arm 48, once again as by a braized joint; and a nylon or teflon spacer 50 is placed between tubes 24 and 26 in the common cavity having the diverging walls 32 and 34. An electrical connector 52 is provided in a female connector 54 and has on its end a spring plate 56 having spaced contacts 58 and 60. With this subassembly for the cap 40 completed it is screwed on to the semicircular bosses 42 of each of the housing sections 10 and 62 (see FIG. 2) to complete the assembly of the switch means. The close fit of the Bourdon tubes 24 and 26 adjacent bores 12 and 14 in addition to the conduits 16 and 18 in the bores 12 and 14 provide connection of switch 48 to the housing sections 10 and 12 which will complete a circuit to the vehicle ground when the switch is assembled to most vehicle structures.

In the modified form of the switch that has occurred during the course of this invention, and as is seen in FIG. 4, Bourdon tubes 64 and 66 are positioned by a nylon or teflon spacer 68 carrying a spring type switch contact arm 70 grounded to a projection 72 of housing section 74 to normally center the same between spaced depending contacts 76 and 78 of the connector assembly 80. A cross-sectional illustration of this assembly is seen in FIG. 5 showing the tubes 64 and 66 with the spacer 68 and switch arm 70 between housing sections 74 and 82 of the completed switch assembly.

In operation, and considering the structure of FIG. 1 with the obvious similarities of the structure of FIG. 4 being well within the skill of the art, it will be recognized that whenever a pressure differential exists between Bourdon tube 24 and Bourdon tube 26 that the switch arm 48 will be pivoted to contact one or the other of space contacts 58 and 60. With reference to FIG. 3 there is shown the aforementioned connection whenever Bourdon tube 24 is pressurized to a greater extend than Bourdon tube 26 to pivot switch arm 48 onto contact 60. In this attitude, the indicator light (not shown) on the vehicle dashboard would be illuminated because of the completion of the ground circuit thereto in that the other terminal of the light is, as has been done in past practice, connected to the positive side of the vehicle battery.

If it is desired, contacts 58 and 60 of FIG. 1 and contacts 76 and 78 of FIG. 4 can be separated and furnished with separate terminal pins to provide an indication of which of the two hydraulic circuits is malfunctioning.

I claim:

1. In a switch responsive to a pressure differential between first and second hydraulic systems:
   a housing defining a cavity therewithin;
   a pair of conduits extending through said housing, each of said conduits being in fluid communication with one of said hydraulic systems;
   said cavity having a central section and a pair of branch sections extending from said central section to each of said conduits;
   first and second Bourdon tubes, one of said tubes being disposed in each of said branch sections and extending into said central section;
   one end of each of said tubes being in fluid communication with a corresponding one of said conduits;
   the walls of said central section being spaced from the other ends of said tubes to permit movement of the latter in response to pressure changes in the fluid in said conduits;
   switch means carried by said housing operably connected to a warning device; and
   said other end of each of said tubes being operably connected to said switch means whereby relative movement between said other ends due to a pressure differential between the fluids in the conduits will operate said switch means and actuate the warning device.

2. The invention of claim 1, the walls of said branch sections engaging said one end of each of said tubes to prevent relative movement between the one end of each of said tubes and the housing.

3. The invention of claim 1:
   spacer means in said central section disposed between said first and second tubes; and
   said spacer means being made of a low friction material to permit relative sliding movement between the tubes and the spacer means.

4. The invention of claim 1:

said switch means including a first contact mounted on the housing and a second contact engaging said tubes;
said first contact having a pair of spaced elements; and
said tubes shifting said second contact into engagement with one of said elements upon relative movement between the tubes.

5. The invention of claim 4, said second contact being pivotally secured to the other end of each of said tubes.

6. The invention of claim 4, spacer means disposed between said first and second tubes; said second contact being an arm carried in said spacer means.